May 27, 1930. J. H. BROWN 1,760,113
LOCK NUT
Original Filed Sept. 28, 1928
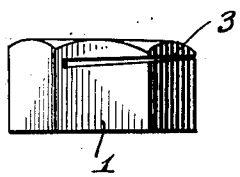
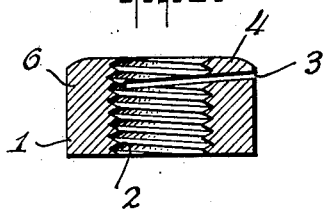
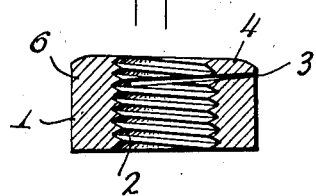
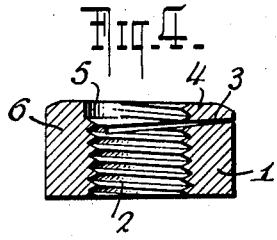
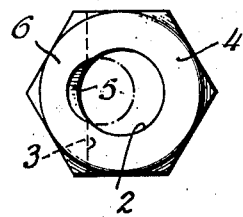
INVENTOR
James Hoyt Brown
BY
Crichton Clarke
ATTORNEY Patented May 27, 1930

1,760,113

UNITED STATES PATENT OFFICE

JAMES HOYT BROWN, OF DENVER, COLORADO

LOCK NUT

Application filed September 28, 1928, Serial No. 308,962. Renewed October 24, 1929.

This invention relates to lock-nuts and to processes of producing the same, and the present application is a division of my application filed May 2nd, 1925, Serial No. 27,451 which issued on October 30, 1928, as Letters Patent Number 1,689,225.

The object of the invention is to provide a lock-nut which is simple in construction inexpensive to produce and effective in operation.

The invention resides in the combination and arrangement of parts in a nut-body and in the details of construction and the process of production, it being understood that changes in the embodiment of invention herein disclosed may be made within the scope of the claims and as generally indicated by the variations in the claims without departing from the spirit of the invention.

In the accompanying drawings forming part of this specification, in which drawings, like reference characters indicate corresponding parts in the different figures:—

Figure 1 is a side elevation of a complete lock-nut embodying the invention.

Figure 2 is a vertical section thru a nut-body after the same is slotted and before it is compressed and reamed.

Figure 3 is a view like Figure 2 after the nut-body and wing have been slightly pressed toward each other.

Figure 4 is a view like Figure 2 after the nut-body has been slotted, reamed and compressed.

Figure 5 is a top plan view of the lock-nut as shown in Figures 1 and 4.

The lock-nut of this invention as shown best in Figures 1, 4 and 5 preferably comprises a nut body 1 which is formed of metal and has the usual threaded-bolt-opening 2 therethru. The nut-body 1 is slotted near its upper end as at 3, the slot preferably extending on a slight downward diagonal. The preferred depth of the slot is shown by the straight dotted line in Figure 5. The slot 3 forms a wedge-shaped upper ring or wing 4 which is preferably pressed down slightly toward the nut-body 1 either all the way across or merely toward the outer end of the slot as shown in Figures 1, 3 and 4. Figure 2 shows the slot before the wing 4 and nut body 1 are displaced relatively. This displacement preferably is accomplished by pressing the wing 4 toward the nut body but the wing may if desired be pressed slightly upward after the slot is formed.

As best shown in Figures 4 and 5, the wing 4 is reamed or enlarged as shown at 5 so that the wing 4 will surround the nut loosely in part and in engagement with the nut thread elsewhere. That is to say, the bolt-thread will be disengaged from the wing 4 at the base portion 6 where the wing is connected with the nut-body 1.

In operation, the slight displacement of the wing 4, causes the lip portion or threads of the wing frictionally to engage the bolt thread with enough pressure to hold the lock-nut in engagement therewith.

While the steps of producing the lock-nut may be performed in various and different order, I usually prefer to shape and thread the nut body, then slot it at 3, then compress the wing 4 toward the body 1 and finally form the crescent or other shaped cut-out portion preferably by using a circular reamer of the diameter shown by the slotted circle in Figure 5. These operations may be done by hand or machine.

The scored-out portion 5 causes the wing 4 loosely to surround the bolt for a portion of its circumference and to grip the thread thereof around the remainder of the bolt's circumference. The proportions of the gripping portion and the non-gripping portion of the wing 4 may be widely varied.

It will be observed from Figures 1 and 4, that the slot 3 is of full width at its inner end but is pressed nearly closed at its outer end. This pressing down of the wing 4 may leave the wing either straight or slightly bent. It is difficult to tell from inspection whether the pressing action, which I confine to the outer half of the wing, actually bows the wing or presses it down at an angle while leaving the wing itself unbowed, and for this reason I have shown the wing as straight after its free end has been pressed down toward the nut-body.

The down-bending of the wing 4 in the manner shown, causes it to exert not merely a friction action but also a torsional or slight twisting action on the thread of the bolt.

It will be observed that that portion of the wing or ring 4 which engages with the threaded portion of the bolt is located in the plane of the ring itself, that is, within the upper and lower confines of the portion 4 which is above the slot 3. It is to be understood that the term "in the plane of said ring" as used throughout this specification and claims is intended to cover any portion of the ring between its faces.

What is claimed as new is:

1. A nut having a ring resiliently connected therewith, said ring having a portion lying within the plane thereof and adapted loosely to surround a bolt when the bolt is positioned thru the nut, said ring having a portion in the plane thereof adapted to engage a thread of the bolt and to exert tension in a direction parallel with the bolt axis thereby to bind the nut on the bolt.

2. A nut lock comprising a nut body having a transverse slot therein, and that portion of the body above the slot being threaded in part in the plane thereof to engage a bolt positioned through the nut, said portion being adapted to exert tension in a direction parallel to the bolt axis thereby to bind the nut on the bolt.

3. A lock nut comprising a threaded nut body slotted near one end to provide a ring resiliently connected with one side of said nut body, said ring loosely surrounding approximately three quarters of the circumference of a bolt, said ring having at the side opposite that at which it is joined to the nut body, a portion in the plane of the ring adapted to exert a resilient pressure on one side of the thread of the bolt.

4. A lock nut comprising a threaded nut body slotted near one end to provide a ring resiliently connected with one side of the nut body, said ring loosely surrounding approximately three quarters of the circumference of a bolt, and having at the side opposite that at which it is joined to the nut body a threaded portion adapted to exert a resilient pressure on one side of the thread of the bolt, said threaded portion lying in the same plane as the ring.

5. A lock nut comprising a threaded nut body slotted near one end to provide a ring resiliently connected with one side of the nut body, said ring having a portion loosely surrounding approximately three quarters of the circumference of a bolt, said ring having at the side opposite that at which it is joined to the nut body a portion lying in the plane of the ring and adapted to exert a resilient pressure on one side of the thread of the bolt, said ring increasing in thickness toward the side at which it is joined to the nut body.

6. A nut having a ring resiliently connected therewith and adapted loosely to surround a bolt when the bolt extends through said nut, said ring having at its free end a portion adapted to engage a thread of the bolt and to exert tension in a direction parallel to the axis of the bolt and thus tending when in action to throw the nut one way and the bolt the other way, said portion lying in the plane of the ring.

7. The combination in a nut of a nut body, a ring integrally attached thereto and adapted generally loosely to surround the bolt when the bolt is positioned through the nut, said ring having a portion in the plane thereof adapted to engage a thread of the bolt and to exert tension in a direction parallel with the bolt axis, thereby to bind the nut on the bolt upon relative movement therebetween.

In testimony whereof I affix my signature.

JAMES HOYT BROWN.